United States Patent
Hum et al.

(10) Patent No.: US 9,910,483 B2
(45) Date of Patent: Mar. 6, 2018

(54) DISTRIBUTION OF TASKS AMONG ASYMMETRIC PROCESSING ELEMENTS

(71) Applicant: Intel Corporation, Santa Clara, CA (US)

(72) Inventors: Herbert Hum, Portland, OR (US); Eric Sprangle, Portland, OR (US); Doug Carmean, Beaverton, OR (US); Rajesh Kumar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/154,517

(22) Filed: Jan. 14, 2014

(65) Prior Publication Data

US 2014/0130058 A1    May 8, 2014

Related U.S. Application Data

(63) Continuation of application No. 13/954,980, filed on Jul. 31, 2013, and a continuation of application No.
(Continued)

(51) Int. Cl.
| | | |
|---|---|---|
| *G06F 9/30* | (2006.01) | |
| *G06F 1/32* | (2006.01) | |
| *G06T 1/20* | (2006.01) | |
| *G06F 9/50* | (2006.01) | |
| *G06F 13/24* | (2006.01) | |

(Continued)

(52) U.S. Cl.
CPC ............ *G06F 1/3293* (2013.01); *G06F 1/206* (2013.01); *G06F 1/3203* (2013.01); *G06F 1/324* (2013.01);
(Continued)

(58) Field of Classification Search
CPC ................. G06F 9/3851; G06F 9/4881; G06F 9/5083–9/5094; G06F 1/32–1/324; G06F 9/46–9/461; G06F 2201/81; G06F 2201/88; G06F 9/3885; G06F 2209/501; G06F 2209/5018; G06F 1/3287–1/3296
See application file for complete search history.

(56) References Cited

U.S. PATENT DOCUMENTS

| | | |
|---|---|---|
| 4,763,242 A | 8/1988 | Lee et al. |
| 5,293,500 A | 3/1994 | Ishida et al. |

(Continued)

FOREIGN PATENT DOCUMENTS

| | | |
|---|---|---|
| GB | 2382180 A | 5/2003 |
| WO | 03100546 A2 | 10/2003 |
| WO | 2004/064119 A2 | 7/2004 |

OTHER PUBLICATIONS

Shimpi, Anand Lal, Intel Yonah Perfromance Preview—Part 1: "The Exclusive First Look at Yonah", Nov. 30, 2005, Webpage available at: http://www.anandtech.com/show/1880.

(Continued)

*Primary Examiner* — William B Partridge
(74) *Attorney, Agent, or Firm* — Nicholson De Vos Webster & Elliott, LLP

(57) ABSTRACT

Techniques to control power and processing among a plurality of asymmetric cores. In one embodiment, one or more asymmetric cores are power managed to migrate processes or threads among a plurality of cores according to the performance and power needs of the system.

4 Claims, 6 Drawing Sheets

Related U.S. Application Data

13/954,977, filed on Jul. 31, 2013, and a continuation of application No. 13/954,979, filed on Jul. 31, 2013, and application No. 13/954,980, and a continuation of application No. 12/220,092, filed on Jul. 22, 2008, now Pat. No. 8,615,647.

(60) Provisional application No. 61/067,737, filed on Feb. 9, 2008.

(51) Int. Cl.
    *G06F 9/38*     (2018.01)
    *G06F 9/46*     (2006.01)
    *G06F 1/20*     (2006.01)
    *G06F 12/0875*     (2016.01)

(52) U.S. Cl.
CPC .......... *G06F 1/3206* (2013.01); *G06F 1/3228* (2013.01); *G06F 1/3287* (2013.01); *G06F 1/3296* (2013.01); *G06F 9/3869* (2013.01); *G06F 9/461* (2013.01); *G06F 9/5088* (2013.01); *G06F 9/5094* (2013.01); *G06F 12/0875* (2013.01); *G06F 13/24* (2013.01); *G06T 1/20* (2013.01); *G06F 2209/5017* (2013.01); *G06F 2212/452* (2013.01); *Y02B 60/121* (2013.01); *Y02B 60/1217* (2013.01); *Y02B 60/1285* (2013.01); *Y02B 60/32* (2013.01)

(56) References Cited

U.S. PATENT DOCUMENTS

| | | | |
|---|---|---|---|
| 5,560,013 A * | 9/1996 | Scalzi | G06F 8/52 703/26 |
| 5,890,799 A | 4/1999 | Yiu et al. | |
| 5,909,567 A | 6/1999 | Novak et al. | |
| 5,991,883 A | 11/1999 | Atkinson | |
| 6,006,320 A | 12/1999 | Parady | |
| 6,021,484 A | 2/2000 | Park | |
| 6,035,408 A | 3/2000 | Huang | |
| 6,058,434 A | 5/2000 | Wilt et al. | |
| 6,219,742 B1 | 4/2001 | Stanley | |
| 6,240,521 B1 | 5/2001 | Barber et al. | |
| 6,405,320 B1 | 6/2002 | Lee et al. | |
| 6,501,999 B1 | 12/2002 | Cai | |
| 6,513,057 B1 | 1/2003 | McCrory | |
| 6,513,124 B1 | 1/2003 | Furuichi et al. | |
| 6,567,839 B1 | 5/2003 | Borkenhagen et al. | |
| 6,631,474 B1 | 10/2003 | Cai et al. | |
| 6,718,475 B2 | 4/2004 | Cai | |
| 6,732,280 B1 | 5/2004 | Cheok et al. | |
| 6,901,522 B2 | 5/2005 | Buch | |
| 6,968,469 B1 | 11/2005 | Fleischmann et al. | |
| 7,017,060 B2 | 3/2006 | Therien et al. | |
| 7,028,167 B2 | 4/2006 | Soltis et al. | |
| 7,069,463 B2 | 6/2006 | Oh | |
| 7,089,344 B1 | 8/2006 | Rader et al. | |
| 7,093,147 B2 | 8/2006 | Farkas et al. | |
| 7,171,546 B2 | 1/2007 | Adams | |
| 7,231,531 B2 | 6/2007 | Cupps et al. | |
| 7,269,752 B2 | 9/2007 | John | |
| 7,334,142 B2 | 2/2008 | Hack | |
| 7,389,403 B1 * | 6/2008 | Alpert | G06F 9/3851 712/10 |
| 7,461,275 B2 | 12/2008 | Belmont et al. | |
| 7,492,368 B1 | 2/2009 | Nordquist et al. | |
| 7,500,126 B2 | 3/2009 | Terechko et al. | |
| 7,500,127 B2 | 3/2009 | Fleck et al. | |
| 7,624,215 B2 | 11/2009 | Axford et al. | |
| 7,743,232 B2 | 6/2010 | Shen et al. | |
| RE41,752 E | 9/2010 | Oh | |
| 8,028,290 B2 | 9/2011 | Rymarczyk et al. | |
| 8,060,727 B2 | 11/2011 | Blixt | |
| 8,214,808 B2 | 7/2012 | Day et al. | |
| 8,327,354 B1 | 12/2012 | Magenheimer et al. | |
| 8,615,647 B2 | 12/2013 | Hum et al. | |
| 8,806,228 B2 * | 8/2014 | Gee et al. | 713/300 |
| 2002/0095609 A1 | 7/2002 | Tokunaga | |
| 2002/0129288 A1 | 9/2002 | Loh et al. | |
| 2003/0065734 A1 | 4/2003 | Ramakesavan | |
| 2003/0088800 A1 | 5/2003 | Cai | |
| 2003/0100340 A1 | 5/2003 | Cupps et al. | |
| 2003/0110012 A1 | 6/2003 | Orenstien et al. | |
| 2003/0224768 A1 | 12/2003 | Adjamah | |
| 2004/0123087 A1 | 6/2004 | Morris | |
| 2004/0133884 A1 | 7/2004 | Zemach et al. | |
| 2004/0243983 A1 | 12/2004 | Kumura | |
| 2005/0050373 A1 | 3/2005 | Orenstien et al. | |
| 2005/0066209 A1 | 3/2005 | Kee et al. | |
| 2005/0132239 A1 | 6/2005 | Athas et al. | |
| 2005/0182980 A1 | 8/2005 | Sutardja | |
| 2006/0026371 A1 | 2/2006 | Chrysos et al. | |
| 2006/0036878 A1 | 2/2006 | Rothman et al. | |
| 2006/0095807 A1 | 5/2006 | Grochowski et al. | |
| 2006/0200651 A1 * | 9/2006 | Collopy et al. | 712/220 |
| 2006/0236127 A1 | 10/2006 | Kurien et al. | |
| 2006/0294401 A1 | 12/2006 | Munger | |
| 2007/0038875 A1 | 2/2007 | Cupps et al. | |
| 2007/0043531 A1 | 2/2007 | Kosche et al. | |
| 2007/0067164 A1 | 3/2007 | Goudar | |
| 2007/0079150 A1 | 4/2007 | Belmont et al. | |
| 2007/0083785 A1 | 4/2007 | Sutardja | |
| 2007/0094444 A1 | 4/2007 | Sutardja | |
| 2007/0157211 A1 | 7/2007 | Wang | |
| 2007/0220246 A1 | 9/2007 | Powell et al. | |
| 2007/0234077 A1 | 10/2007 | Rothman et al. | |
| 2007/0283138 A1 | 12/2007 | Miga et al. | |
| 2008/0016374 A1 | 1/2008 | Gee et al. | |
| 2008/0028244 A1 | 1/2008 | Capps et al. | |
| 2008/0028245 A1 | 1/2008 | Ober et al. | |
| 2008/0077928 A1 * | 3/2008 | Matsuzaki | G06F 9/5044 718/104 |
| 2008/0141011 A1 | 6/2008 | Zhang et al. | |
| 2008/0172657 A1 | 7/2008 | Bensal et al. | |
| 2008/0216073 A1 | 9/2008 | Yates et al. | |
| 2008/0244538 A1 | 10/2008 | Nair et al. | |
| 2008/0263324 A1 | 10/2008 | Sutardja et al. | |
| 2008/0307244 A1 | 12/2008 | Bertelsen et al. | |
| 2009/0089758 A1 | 4/2009 | Chen et al. | |
| 2009/0109230 A1 | 4/2009 | Miller et al. | |
| 2009/0150893 A1 * | 6/2009 | Johnson et al. | 718/104 |
| 2009/0165014 A1 | 6/2009 | Park | |
| 2009/0172654 A1 | 7/2009 | Zhao et al. | |
| 2009/0193243 A1 | 7/2009 | Ely | |
| 2009/0216073 A1 | 8/2009 | Zipper | |
| 2009/0222654 A1 | 9/2009 | Hum et al. | |
| 2010/0185833 A1 | 7/2010 | Saito et al. | |
| 2010/0268916 A1 | 10/2010 | Hu et al. | |

OTHER PUBLICATIONS

Irani et al., "Online Strategies for Dynamic Power Management in Systems with Multiple Power-Saving States" ACM Transactions on Embedded Computing Systems, vol. 2, No. 3, Aug. 2003, pp. 325-346.

Lefurgy et al., "Energy Management for Commercial Servers," Computer, IEEE, Dec. 2003. vol. 36, Issue 12, pp. 39-48.

Kumar et al., "Single-ISA Heterogeneous Multi-Core Architectures: The Potential for Processor Power Reduction," Proceedings of the 36th AnnuaiiEEE/ACM International Symposium on Microarchitecture, 2003, pp. 81-92.

Benin I et al., "A Survey of Design Techniques for System-Level Dynamic Power Management," IEEE Transactions on Very Large Scale Integration (VLSI) Systems, Jun. 2000, vol. 8, Issue 3, pp. 299-316.

Abramson et at, "Intel Virtualization Technology for Directed 1/0," Intel Technology Journal, Aug. 10, 2006, vol. 10, Issue 3, pp. 179-192.

International Search Report of PCT/2007/000010, Swedish Patent Office, Stockholm, Sweden, dated May 16, 2007, 4 pages.

(56) References Cited

OTHER PUBLICATIONS

Seng et al. "Reducing Power with Dynamic Critical Path Information", Proc. of the 34th annual ACM/IEEE international symposium on Microarchitecture, ACM, Dec. 2001, pp. 114-123.
Office Action Received for U.S. Appl. No. 14/498,319 mailed on Oct. 14, 2015, 6 pages.
Office Action Received for U.S. Appl. No. 14/498,135 mailed on Oct. 15, 2015, 6 pages.
Office Action Received for U.S. Appl. No. 14/498,014 mailed on Oct. 6, 2015, 6 pages.
Office Action Received for U.S. Appl. No. 14/033,008 mailed on Sep. 17, 2015, 13 pages.
Advisory Action from U.S. Appl. No. 12/220,092 mailed Jul. 31, 2012, 4 pages.
Advisory Action from U.S. Appl. No. 12/220,092 mailed Oct. 11, 2011, 3 pages.
Advisory Action from U.S. Appl. No. 12/380,210 mailed Apr. 6, 2012, 4 pages.
Advisory Action from U.S. Appl. No. 12/380,210 mailed Feb. 25, 2014, 6 pages.
Final Office Action from U.S. Appl. No. 12/220,092 mailed Jul. 26, 2011, 8 pages.
Final Office Action from U.S. Appl. No. 12/220,092 mailed May 15, 2013, 12 pages.
Final Office Action from U.S. Appl. No. 12/220,092 mailed May 21, 2012, 20 pages.
Final Office Action from U.S. Appl. No. 12/380,210 mailed Dec. 9, 2013, 16 pages.
Final Office Action from U.S. Appl. No. 12/380,210 mailed Feb. 10, 2012, 13 pages.
Final Office Action from U.S. Appl. No. 13/954,977 mailed Jun. 21, 2016, 7 pages.
Final Office Action from U.S. Appl. No. 13/954,979 mailed Jun. 13, 2016, 7 pages.
Final Office Action from U.S. Appl. No. 13/954,980 mailed Jun. 13, 2016, 7 pages.
Final Office Action from U.S. Appl. No. 14/033,008 mailed Feb. 12, 2016, 6 pages.
Final Office Action from U.S. Appl. No. 14/033,008 mailed Oct. 21, 2016, 13 pages.
Final Office Action from U.S. Appl. No. 14/498,014 mailed Feb. 3, 2016, 15 pages.
Final Office Action from U.S. Appl. No. 14/498,014 mailed Oct. 25, 2016, 13 pages.
Final Office Action from U.S. Appl. No. 14/498,135 mailed Mar. 2, 2016, 6 pages.
Final Office Action from U.S. Appl. No. 14/498,319 mailed Mar. 29, 2016, 6 pages.
Non Final Office Action from U.S. Appl. No. 14/033,008 mailed Jun. 16, 2016, 9 pages.
Non Final Office Action from U.S. Appl. No. 14/498,014 mailed Jun. 13, 2016, 8 pages.
Non-Final Office Action from U.S. Appl. No. 12/220,092 mailed Dec. 5, 2012, 15 pages.
Non-Final Office Action from U.S. Appl. No. 12/220,092 mailed Dec. 29, 2011, 13 pages.
Non-Final Office Action from U.S. Appl. No. 12/220,092 mailed Feb. 9, 2011, 7 pages.
Non-Final Office Action from U.S. Appl. No. 12/380,210 mailed Jun. 26, 2013, 18 pages.
Non-Final Office Action from U.S. Appl. No. 12/380,210 mailed Mar. 20, 2014, 25 pages.
Non-Final Office Action from U.S. Appl. No. 12/380,210 mailed Sep. 26, 2011, 14 pages.
Non-Final Office Action from U.S. Appl. No. 13/954,977 mailed Aug. 27, 2015, 16 pages.
Non-Final Office Action from U.S. Appl. No. 13/954,977 mailed Jan. 22, 2016, 9 pages.
Non-Final Office Action from U.S. Appl. No. 13/954,979 mailed Aug. 31, 2015, 16 pages.
Non-Final Office Action from U.S. Appl. No. 13/954,979 mailed Jan. 14, 2016, 9 pages.
Non-Final Office Action from U.S. Appl. No. 13/954,980 mailed Aug. 31, 2015, 16 pages.
Non-Final Office Action from U.S. Appl. No. 13/954,980 mailed Jan. 14, 2016, 8 pages.
Non-Final Office Action from U.S. Appl. No. 14/498,135 mailed Aug. 18, 2016, 7 pages.
Notice of Allowance from U.S. Appl. No. 12/220,092 mailed Aug. 7, 2013, 7 pages.
Notice of Allowance from U.S. Appl. No. 12/380,210 mailed Oct. 22, 2014, 4 pages.
Notice of Allowance from U.S. Appl. No. 12/380,210 mailed Sep. 15, 2014, 5 pages.
Requirement for Restriction/Election from U.S. Appl. No. 12/220,092 mailed Apr. 25, 2012, 4 pages.
Office action from U.S. Appl. No. 13/954,977, dated Nov. 23, 2016, 11 pages.
Office action from U.S. Appl. No. 13/954,980, dated Jan. 18, 2017, 9 pages.
Final Office action from U.S. Appl. No. 14/498,135, dated Jan. 19, 2017, 7 pages.
Office action from U.S. Appl. No. 14/498,319, dated Dec. 6, 2016, 6 pages.
Non Final Office Action from U.S. Appl. No. 14/498,014 dated Apr. 3, 2017, 28 pages.
Non-Final Office Action from U.S. Appl. No. 13/954,979, dated Apr. 3, 2017, 20 pages.
Non-Final Office Action from U.S. Appl. No. 14/033,008, dated Mar. 21, 2017, 16 pages.
Notice of Allowance from U.S. Appl. No. 13/954,977, dated Apr. 11, 2017, 13 pages.
Final Office Action from U.S. Appl. No. 13/954,980, dated Jun. 23, 2017, 20 pages.
Notice of Allowance from U.S. Appl. No. 13/954,979, dated Sep. 15, 2017, 16 pages.
Notice of Allowance from U.S. Appl. No. 14/033,008, dated May 10, 2017, 9 pages.
Notice of Allowance from U.S. Appl. No. 14/498,014, dated Aug. 9, 2017, 17 pages.
Notice of Allowance from U.S. Appl. No. 14/498,135, dated Aug. 10, 2017, 6 pages.
Notice of Allowance from U.S. Appl. No. 14/498,135, dated May 10, 2017, 12 pages.
Notice of Allowance from U.S. Appl. No. 14/498,319, dated May 1, 2017, 17 pages.
Notice of Allowance from U.S. Appl. No. 14/498,319, dated Sep. 27, 2017, 10 pages.

* cited by examiner

US 9,910,483 B2

DISTRIBUTION OF TASKS AMONG ASYMMETRIC PROCESSING ELEMENTS

RELATED APPLICATIONS

This Application is a Continuation, which claims benefit under 35 USC § 120 of application Ser. No. 13/954,979, filed Jul. 31, 2013, currently pending; which claims benefit under 35 USC §120 of application Ser. No. 12/220,092, filed Jul. 22, 2008, issued as U.S. Pat. No. 8,615,647; which claims benefit under 35 USC § 119(e) of Provisional Application Ser. No. 61/067,737, filed Feb. 29, 2008.

FIELD OF THE INVENTION

Embodiments of the invention relate generally to the field of information processing and more specifically, to the field of distributing program tasks among various processing elements.

BACKGROUND OF THE INVENTION

As more processing throughput is required from modern microprocessors, it is often at the expense: of power consumption. Some applications, such as mobile internet devices (MIDs) ultra-mobile personal computers (UMPCs), cellular phones, personal digital assistants (PDAs), and even laptop/notebook computers, may benefit from processors that consume relatively little power. However, achieving relatively high processing throughput at relatively low power is a challenge, involving various design trade-offs, depending on the usage models of the computing platform.

One approach to reducing power in a computing platform when there is relatively little activity, is to place the processor in a low-power state. However, placing a processor in a low-power state or returning a processor from a low-power state may require a non-trivial amount of time. Therefore, it may or may not be worth the time required to place a processor in a low-power state or to return the processor from a low-power state. Furthermore, not all processes and tasks that are run on a processor require the full processing throughput of the processor.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Figure 1:
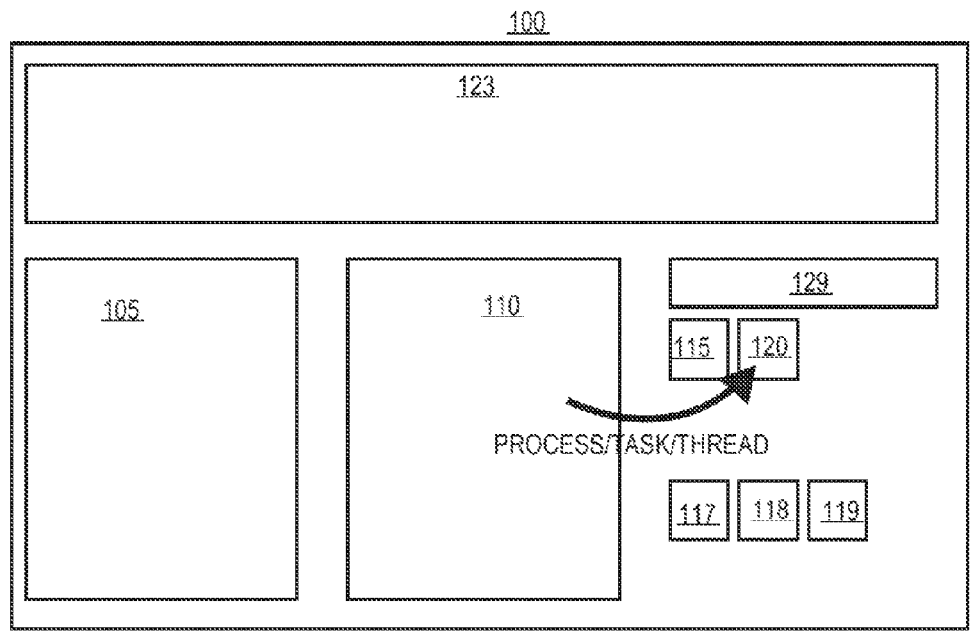
FIG. 1 illustrates a block diagram of a microprocessor, in which at least one embodiment of the invention may be used.

Embodiments of the invention include a microprocessor or processing system having a number of asymmetric processing elements. In some embodiments, each processing element is a processor core, having one or more execution resources, such as arithmetic logic units (ALUs), instruction decoder, and instruction retirement unit, among other things. In some embodiments, the number of asymmetric processing elements has at least two different processing throughput or performance capabilities, power consumption characteristics or limits, voltage supply requirements, clock frequency characteristics, number of transistors, and/or instruction set architectures (ISAs). In one embodiment, an asymmetric microprocessor includes at least one main processor core having larger power consumption characteristics and/or processing throughput/performance characteristics than at least one other processing core within or otherwise associated with the microprocessor.

In one embodiment, a process or task running or intended to run on a main higher power/performance processing core may be transferred to one of the other lower power/performance processing cores for various reasons, including that the process or task does not require the processing throughput of one of the main cores, the processor or the system in which its used is placed into or otherwise requires a lower-power consumption condition (such as when running on battery power), and for increasing the processing throughput of the asymmetric microprocessor or system in which the higher power/performance cores and lower power/performance cores are used. For example, in one embodiment, the asymmetric processing elements may be used concurrently or otherwise in parallel to perform multiple tasks or processes, thereby improving the overall throughput of the processor and processing system.

In one embodiment, the at least one main processing core has a different ISA than at least one of the at least one processor cores having a lower power consumption characteristic and/or processing performance capability. In one embodiment, instruction translation logic in the form of hardware, software, of some combination thereof, may be used to translate instructions for the at least one main processor core into instructions for the at least one other lower-power/performance processing core. For example, in one embodiment, one or more of the main higher power/performance cores may have a complex instruction set computing (CISC) architecture, such as the "x86" computing architecture, and therefore performs instructions that are intended for x86 processor cores. One or more of the lower power/performance cores may have a different ISA than the main core, including a reduced instruction set computing (RISC) architecture, such as an Advanced RISC Machine (ARM) core. In other embodiments, the main processing element(s) and the lower power/Performance processing element(s) may include other architectures, such as the MIPS ISA. In other embodiments the main processing element(s) may have the same ISA as the lower power/performance element(s) (e.g., x86).

In one embodiment, a number of different threads, processes, or tasks associated with one or more software programs may be intelligently moved among and ran on a number of different processing elements, having a number of different processing capabilities (e.g., operating voltage, performance, power consumption, clock frequency, pipeline depth, transistor leakage, ISA), according to the dynamic performance and power consumption needs of the processor or computer system. For example, if one process, such as that associated with a spreadsheet application, does not require the full processing capabilities of a main, higher performance processor core, but may be instead be ran with acceptable performance on a lower-power core, the process may be transferred to or otherwise ran on the lower power core and the main, higher power processor core may be placed in a low power state or may just remain idle. By running threads/processes/tasks on a processor core that better matches the performance needs of the thread/process/task, power consumption may be optimized, according to some embodiments.

FIG. 1 illustrates a microprocessor in which at least one embodiment of the invention may be used. In particular, FIG. 1 illustrates microprocessor 100 having one or more main processor cores 105 and 110, each being able to operate at a higher performance level (e.g., instruction throughput) or otherwise consume more power than one or more low-power cores 115, 120. In one embodiment, the low-power cores may be operated at the same or different operating voltage as the main cores. Furthermore, in some embodiments, the low-power cores may operate a different clock speed or have fewer execution resources, such that they operate at a lower performance level than the main cores.

In other embodiments, the low-power cores may be of a different ISA than the main cores. For example, the low-power cores may have an ARM ISA and the main cores may have an x86 ISA, such that a program using x86 instructions may need to have these instructions translated into ARM instructions if a process/task/thread is transferred to one of the ARM cores. Because the process/thread/task being transferred may be one that does not require re performance of one of the main cores, a certain amount of latency associated with the instruction translation may be tolerated without noticeable or significant loss of performance.

Also illustrated in FIG. 1 is at least one other non-CPU functional unit 117, 118, and 119 which may perform other non-CPU related operations. In one embodiment, the functional units 117, 118, and 119 may include functions such as graphics processing, memory control and 110 or peripheral control, such as audio, video, disk control, digital signal processing, etc. The multi-core processor of FIG. 1 also illustrates a cache 123 that each core can access for data or instructions corresponding to any of the cores.

In one embodiment, logic 129 may be used to monitor performance or power of any of the cores illustrated in FIG. 1 in order to determine whether a process/task/thread should be migrated from one core to another to optimize power and performance. In one embodiment logic 129 is associated with the main cores 105 and 110 to monitor an activity level of the cores to determine whether the processes/threads/tasks running on those cores could be run on a lower-power core 115, 120 at an acceptable performance level, thereby reducing the overall power consumption of the processor. In other embodiments, logic 129 may respond to a power state of the system, such as when the system goes from being plugged into an A/C outlet to battery power. In this case, the OS or some other power state monitoring logic may inform logic 129 of the new power conditions and the logic 129 may cause a current-running process (or processes yet to be scheduled to run) to either be transferred (or scheduled) to a lower-power core (in the case of going from A/C to battery, for example) or from a lower-power core to a main core (in the case of going from battery to A/C, for example). In some embodiments, an operating system (OS) may be responsible for monitoring or otherwise controlling the power states of the processor and/or system, such that the logic 129 simply reacts to the OS's commands to reduce power by migrating tasks/threads/processes to a core that better matches the performance needs of the tasks/threads/processes while accomplishing the power requirements dictated or indicated by the OS.

In some embodiments, the logic 129 may be hardware logic or software, which may or may not determine a core(s) on which a process/task/thread should be mu independently of the OS. In one embodiment, for example, logic 129 is implemented in software to monitor the activity level of the cores, such as the main cores, to see if it drops below a threshold level, and in response thereto, causes one or more processes mailing on the monitored core(s) to be transferred to a lower-power core, such as cores 115 and 120. Conversely, logic 129 may monitor the activity level of a process running on a lower-power core 115 and 120 in order to determine whether it is rising above a threshold level, thereby indicating the process should be transferred to one of the main cores 105, 110. In other embodiments, logic 129 may independently monitor other performance or power indicators within the processor or system and cause processes/threads/tasks to be migrated to cores that more closely fit the performance needs of the tasks/processes/threads while meeting the power requirements of the processor of the system at a given time. In this way, the power and performance of processor 100 can be controlled without the programmer or OS being concerned or even aware of the underlying power state of the processor.

In other embodiments, each core in FIG. 1 may be concurrently running different tasks/threads/processes to get the most performance benefit possible from the processor. For example, in one embodiment, a process/thread/task that requires high performance may be run on a main core 105, 110 concurrently with a process/thread/task that doesn't require as high performance as what the main cores are able to deliver on lower-power cores 115, 120. In one embodiment, the programmer determines where to schedule these tasks/threads/processes, whereas in other embodiments, these threads/tasks/processes may be scheduled by an intelligent thread scheduler (not shown) that is aware of the performance capabilities of each core and can schedule the threads to the appropriate core accordingly. In other embodiments, the threads are simply scheduled without regard to the performance capabilities of the underlying cores and the threads/processes/tasks are migrated to a more appropriate core after the activity levels of the cores in response to the threads/processes/tasks are determined. In this manner, neither an OS nor a programmer need be concerned about where the threads/processes/tasks are scheduled, because the threads/processes/tasks are scheduled on the appropriate core(s) that best suits the performance requirement of each thread while maintaining the power requirements of the system or processor.

In one embodiment, logic 129 may be hardware, software, or some combination thereof. Furthermore, logic 129 may be distributed within one or more cores or exist outside the cores while maintaining electronic connection to the one or more cores to monitor activity/power and cause threads/tasks/processes to be transferred to appropriate cores.

Figure 2:
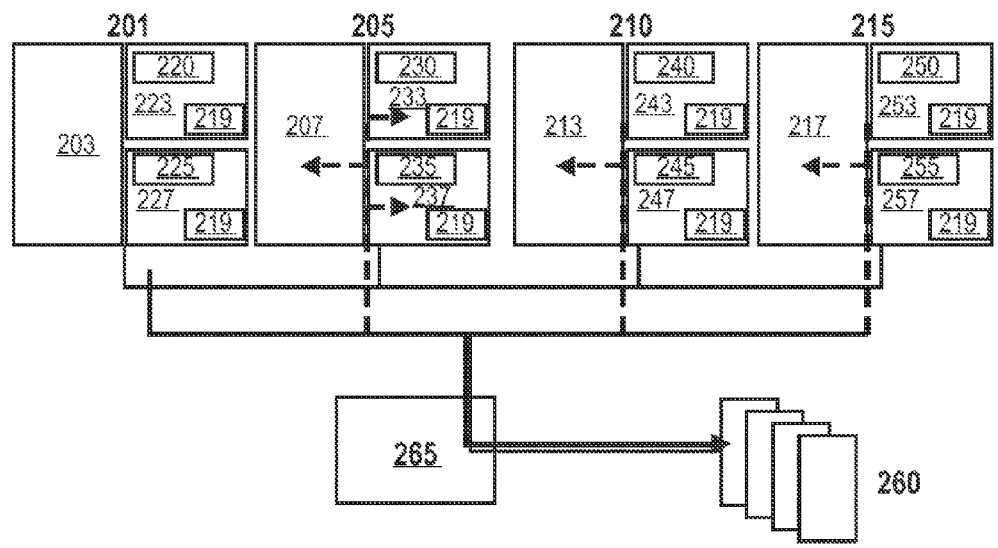
FIG. 2 illustrates a block diagram of a shared bus computer system, in which at least one embodiment of the invention may be used.

FIG. 2, for example, illustrates a front-side-bus (FSB) computer system in which one embodiment of the invention may be used. Any processor 201, 205, 210, or 215 may include asymmetric cores (differing in performance power, operating voltage, clock speed or ISA), which may access information from any local level one (L1) cache memory 220, 225, 230, 235, 240, 245, 250, 255 within or otherwise associated with one of the processor cores 223, 227, 233, 237, 243, 247, 253, 257. Furthermore, any processor 201, 205, 210, or 215 may access information from ally one of the shared level two (L2) caches 203, 207, 213, 217 or from system memory 260 via chipset 265. One or more of the processors in FIG. 2 may include or otherwise be associated with logic 219 to monitor and/or control the scheduling or migration of processes/threads/tasks between each of the asymmetric cores of each processor. In one embodiment, logic 219 may be used to schedule or migrate threads/tasks/processes to or from one asymmetric core in one processor to another asymmetric core in another processor.

Figure 3:
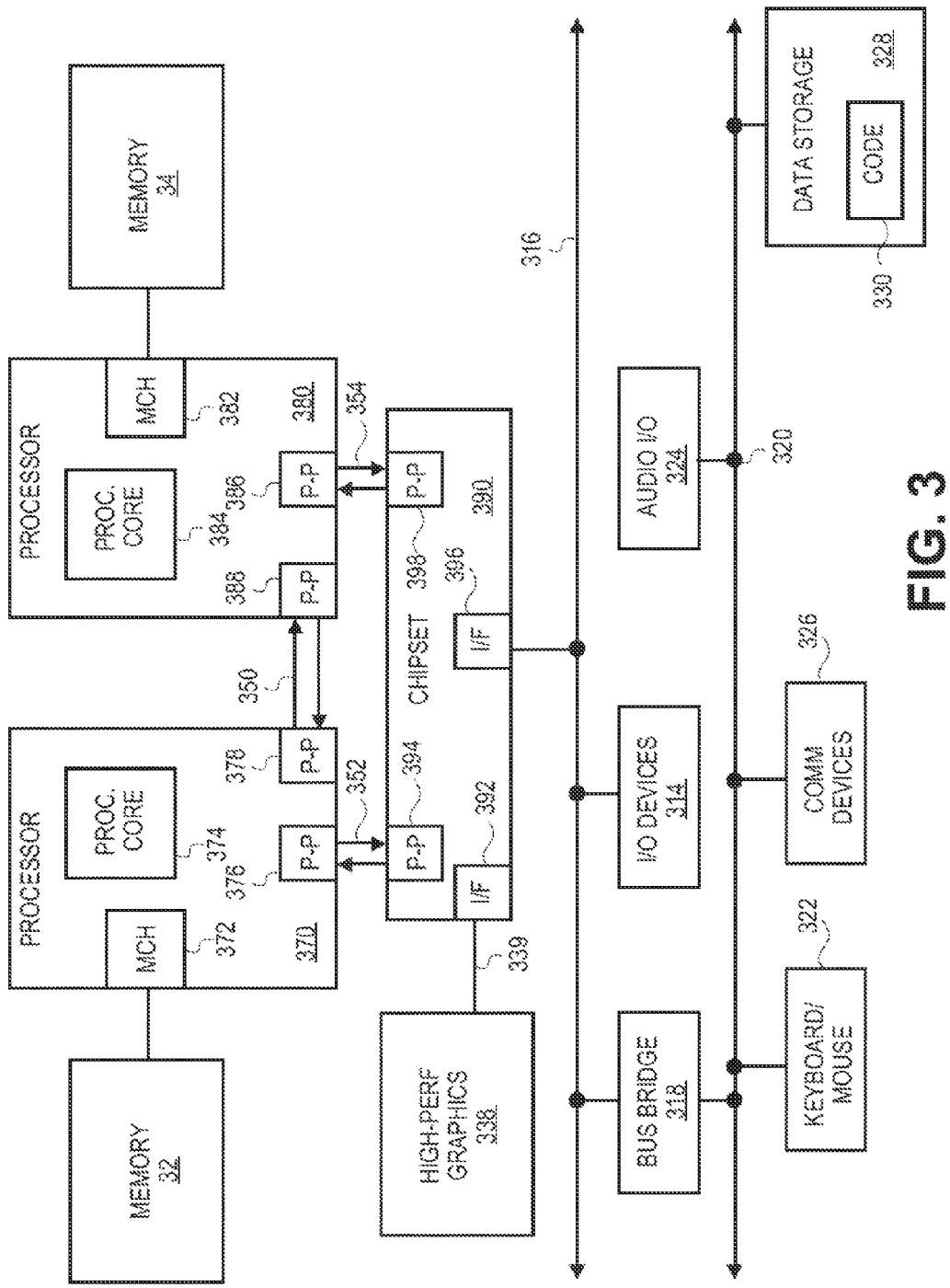
FIG. 3 illustrates a block diagram a point-to-point interconnect computer system, in which at least one embodiment of the invention may be used

In addition to the FSB computer system illustrated in FIG. 2, other system configurations may be used in conjunction with various embodiments of the invention, including point-to-point (P2P) interconnect systems and ring interconnect systems. The P2P system of FIG. 3, for example, may include several processors, of which only two, processors 370, 380 are shown by example. Processors 370, 380 may each include a local memory controller hub (MCH) 372, 382 to connect with memory 32, 34. Processors 370, 380 may exchange data via a point-to-point (PtP) interface 350 using PtP interface circuits 378, 388. Processors 370, 380 may each exchange data with a chipset 390 via individual PtP interfaces 352, 354 using point to point interface circuits 376, 394, 386, 398. Chipset 390 may also exchange data with a high-performance graphics circuit 338 via a high-performance graphics interface 339. Embodiments of the invention may be located within any processor having any number of processing cores, or within each of the PtP bus agents of FIG. 3. In one embodiment, any processor core may include or otherwise be associated with a local cache memory (not shown). Furthermore, a shared cache (not shown) may be included in either processor outside of both processors, yet connected with the processors via p2p interconnect, such that either of both processors' local cache information may be stored in the shared cache if a processor is placed into a low power mode. One or more of the processors or cores in FIG. 3 may include or otherwise be associated with logic to monitor and/or control the scheduling or migration of processes/threads/tasks between each of the asymmetric cores of each processor.

Figure 4:
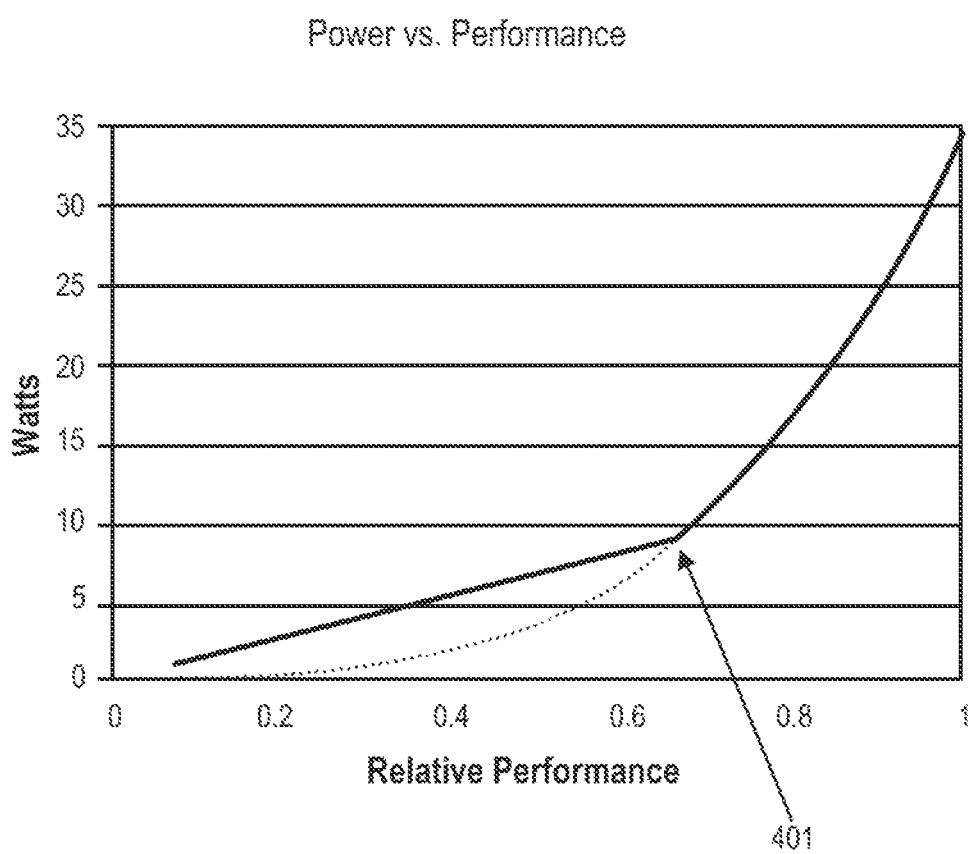
FIG. 4 is a curve showing the relationship between power and performance using at least one embodiment of the invention.

FIG. 4 is a graph illustrating the performance and power characteristics associated with a processor when scaling voltage and frequency including techniques according to at least one embodiment of the invention. Reducing voltage is an efficient way of reducing power since the frequency scales linearly with the voltage, while the power scales as the voltage 3 (power=CV 2F). Unfortunately, this efficient voltage scaling, approach only works within a range of voltages: at some point, "Vmin", the transistor switching frequency does not scale linearly with voltage. At this point (401), to further reduce power, the frequency is reduced without dropping the voltage. In this range, the power scales linearly with the frequency which is not nearly as attractive as when in the range where voltage scaling is possible. In one embodiment, power consumption of the system may be reduced below the minimum point 401 of a typical multi-core processor having symmetric processing elements by scheduling or migrating processes/threads/tasks from higher-performance/power cores to lower-performance/power cores if appropriate. In FIG. 4, the power/performance curve segment 405 indicates where the overall non-linear power/performance curve could be extended to enable more power savings, in one embodiment.

Figure 5:
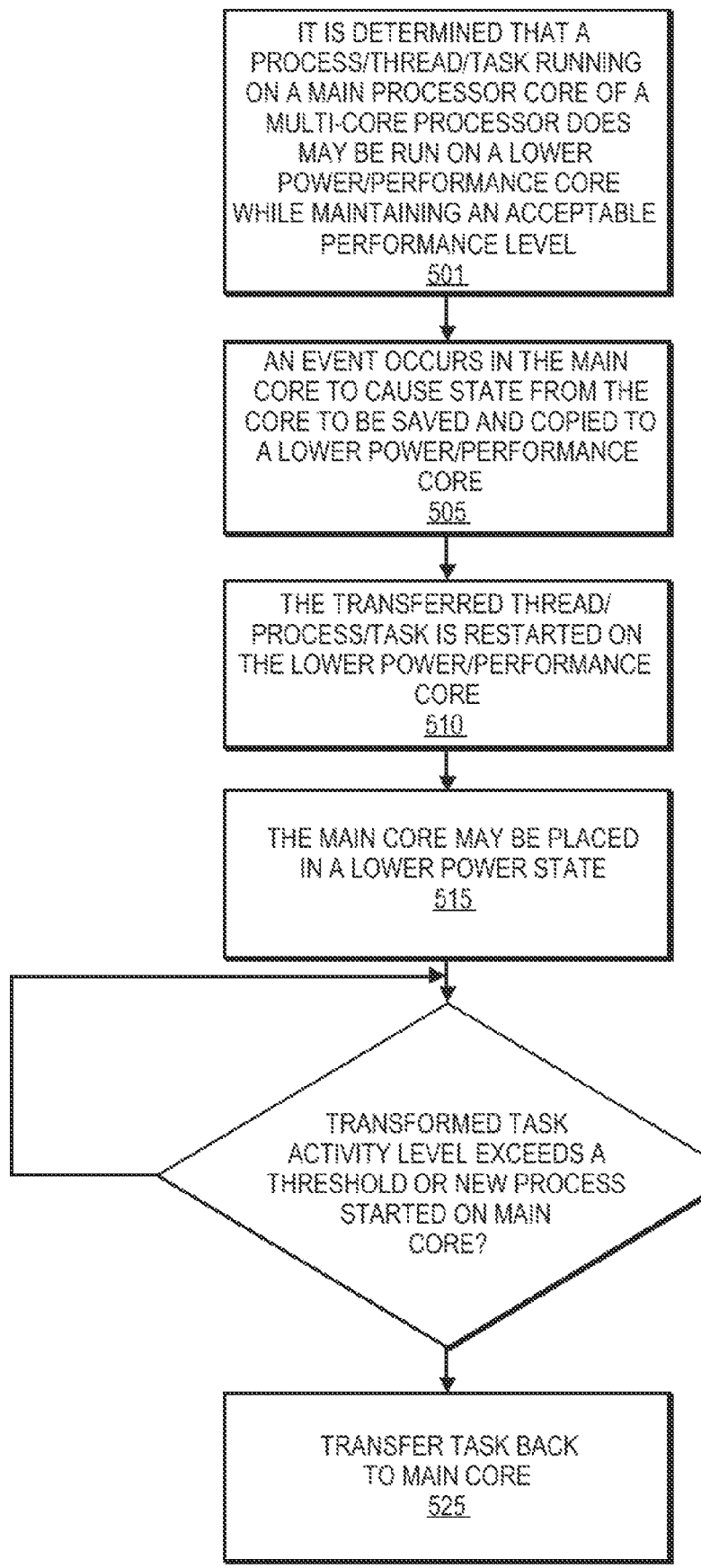
FIG. 5 is a flow diagram of operations that may be used for performing at least one embodiment of the invention.

FIG. 5 illustrates a flow diagram of operations that may be used in conjunction with at least one embodiment of the invention. At operation 501, it is determined that a process/thread/task running on a main processor core of a multi-core processor does may be run on a lower power/performance core while maintaining an acceptable performance level. In one embodiment, the determination could be made by monitoring the activity level of the main core in response to miming the thread/process/task and comparing it to a threshold value, corresponding to an acceptable performance metric of the lower power/performance core. In other embodiments, the determination could be made based on system power requirements, such as when the system is running on A/C power versus battery power. In yet other embodiments, a thread/process/task may be designated to require only a certain amount of processor performance, for example, by a programmer, the OS, etc. In other embodiments, other techniques for determining whether a task/thread/process could be transferred to a lower power/performance core, thereby reducing power consumption.

At operation 505, an event (e.g., yield, exception, etc.) occurs in the main core to cause state from the core to be saved and copied to a lower power/performance core. In one embodiment, a handler program is invoked in response to the event to cause the main core state to be transferred from the main core to a lower power/performance core. At operation 510, the transferred thread/process/task is restarted or resumed on the lower power/performance core. At operation 515, the main core may be placed in a lower power state (e.g., paused, halted, etc.) until 520 either the transferred process/task/thread requires above a threshold level of performance, in which case the thread/process/task may be transferred back to the main core 525 in a similar manner as it was transferred to the lower power/performance core, or another task/process/thread is scheduled for execution on the main core.

In one embodiment, the thread/process/task transferred from the main core to the lower power/performance core is first translated from the ISA of the main core to the ISA of the lower power/performance core, if the two have different architectures. For example, in one embodiment, the main core is an x86 architecture core and the lower power/performance core is an ARM architecture core, in which case instructions of the transferred thread/process/task may be translated (for example, by a software binary translation shell) from x86 instructions to ARM instructions. Because the thread/process/task being transferred is by definition one that does not require as much performance as to require it to be ran on the main core, a certain amount of latency may be tolerated in translating the process/task/thread from the x86 architecture to ARM architecture.

Figure 6:
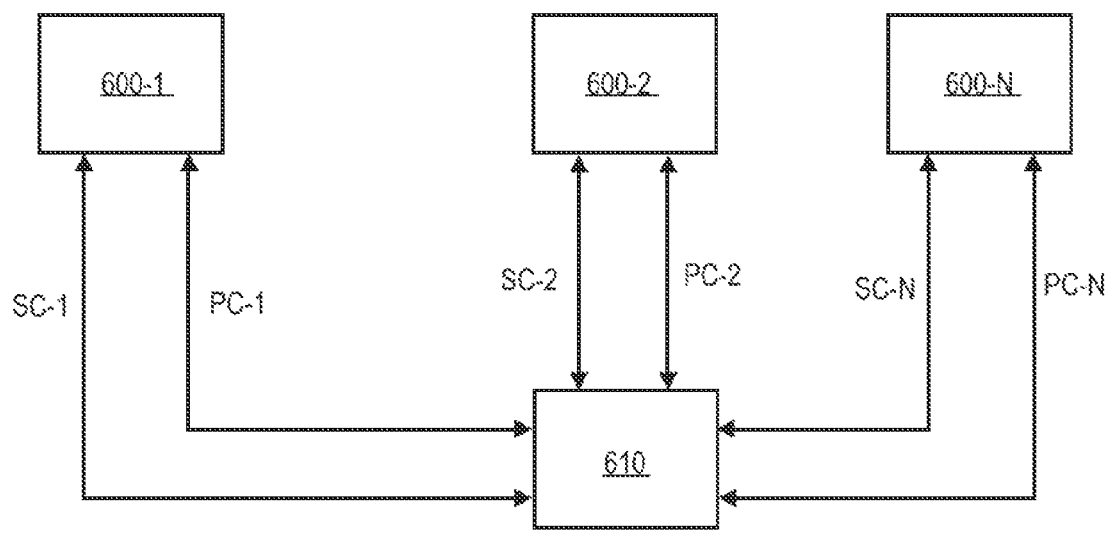
FIG. 6 illustrates a number of processing units and an activity level, thermal, or power detection/monitoring unit that may be used in at least one embodiment.

FIG. 6 illustrates a processing apparatus having a number of individual processing units between which processes/threads/tasks may be swapped under control of an activity level monitor, or thermal or power monitor, according to one embodiment. In the embodiment of FIG. 6, N processing units, processing unit 600-1, 600-2 through 600-N are coupled to a monitor or detection (generically referred to as "monitor") logic 610. In one embodiment, the monitor 610 includes an activity, thermal and/or power monitoring unit that monitors the activity/performance, power consumption, and/or temperature of the processing units 600-1 through 600-N. In one embodiment, performance counters may be used to monitor the activity level of processing units 600-1 through 600-N. In one embodiment, the monitor 610 orchestrates process shifting between processing units in order to manage power consumption and/or particularly thermal concerns, while maintaining an acceptable level of performance.

In one embodiment, each processing unit provides a monitor value that typically reflects activity level, power consumption and/or temperature information to the monitor 610 via signals such as processor communication (PC) lines PC-1 through PC-N. The monitor value may take a variety of forms and may be a variety of different types of information. For example, the monitor value may simply be an analog or digital reading of the temperature of each processing unit. Alternatively, the monitor value may be a simple or complex activity factor that reflects the operational activity level of a particular processing unit. In some embodiments, power consumption information reflected by the monitor value may include a measured current level or other indication of how much power is being consumed by the processing unit. Additionally, some embodiments may convey power consumption information to the monitor 110 that is a composite of several of these or other types of known or otherwise available means of measuring or estimating power consumption. Accordingly, some power consumption metric which reflects one or more of these or other power consumption indicators may be derived. The transmitted monitor value may reflect a temperature or a power consumption metric, which itself may factor in a temperature. Serial, parallel, and/or various known or otherwise available protocols may be used to transmit this information to the power monitor.

In one embodiment, the monitor 610 receives the power consumption information from the various processing units and analyzes whether the power consumption or activity level of one processing unit is at a level to justify the overhead of re-allocating processes to different processing units. For example, the monitor may be triggered to rearrange processes when a particular processing unit falls below a threshold level of activity, or when power consumption is above an acceptable level. In one embodiment, the monitor 610 may develop a total power consumption metric to indicate the total power consumption, total activity level metric, or total thermal state of all processing units to effectuate the various power control strategies. In one embodiment, the monitor 610 may be a hardware component, a software component, routine:, or module, or a combination of hardware and software that works either dependently or independently of the operating system.

one embodiment, the monitor communicates to the processing units via thread or process swap control (SC) lines SC-1 through SC-N. The monitor is capable of moving and exchanging processes by sending commands via the SC lines. Thus, processes can be swapped between processing units, rotated between processing units, etc. . . . , in response to the particular chosen activity level, thermal, or power consumption metric being reached. Alternatively, or in addition to power consumption metric triggered process management, process rotation between processing units may be periodically performed to reduce the power consumption of the processor.

Figure 7:
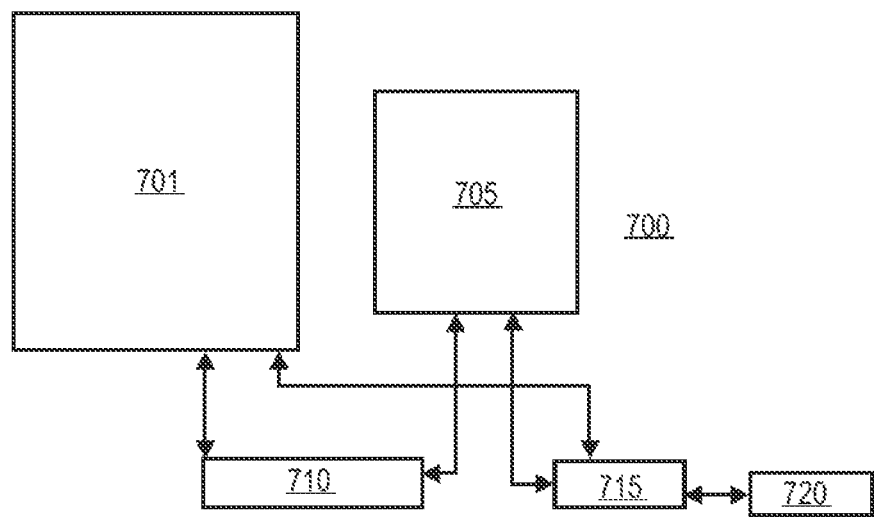
FIG. 7 illustrates a power management logic according to one embodiment.

FIG. 7 illustrates a power management logic that may be used in conjunction with at least one embodiment. In one embodiment, the logic of FIG. 7 may be used to transition one or more of the asymmetric cores 701, 705 to a power state, such as a "C6" state. In one embodiment, the power management controller 715 sets one or more of the cores 701, 705 into a low power state or returns one or more of them to a prior power state. For example, in one embodiment, if the performance of core 701 is not needed, the power management controller 715 may set the core 701 into low power state (e.g., C6 state) by using memory 710 to store state or context information corresponding to the core 701. Once the state and context is saved, clocks and/or voltage supplies within the core 701 may be scaled so that the core 701 does not consume more than a threshold amount of power. In one embodiment, the clocks of the core 701 may be halted and the voltage dropped to some minimum value (e.g., 0V) to save power.

Power management controller 715 may place core 701 into a power state corresponding to an operating mode of the core 701 by controlling clock frequencies and power supplies to core 701. For example, the power management controller may turn the clocks of core 701 back to their previous frequencies and voltages back to their original level and return the state and context information from memory 710 so that the core 701 may function as it previously did before entering the low power state. In one embodiment, the return of core 701 to a previous power state may be in response to an interrupt from interrupt controller 720. In one embodiment, the power management controller causes the core 701 to entire a previous power state in response to a signal from the interrupt controller 720 and places the low-power core 705 into a low power state using the same process as for the higher-performance core 701. In one embodiment, if an interrupt occurs corresponding to a process or thread requiring less performance, and core 701 is in an idle state (e.g. in an idle loop), the core 701 may once again enter a low power state and the core 705 may enter an operating power state to handle processing the lower-performance process or thread. If an interrupt occurs corresponding to a process or thread requiring less performance and both cores 701 and 705 are in low power state, then only core 705 enters an operating state to handle the required processing while core 701 remains in low power state. In this manner, the logic 700 uses cores that more closely correspond to the processing needs of a thread or process, thereby saving system power.

Figure 8:
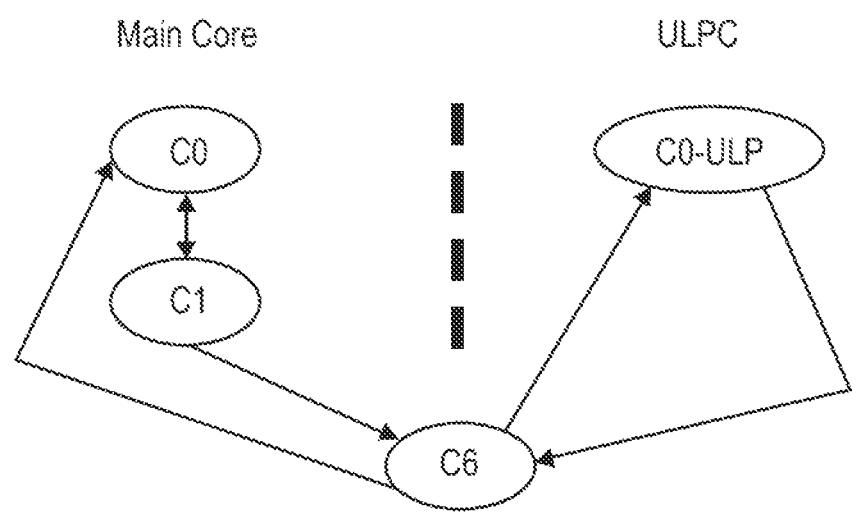
FIG. 8 illustrates a technique to transition between at least two asymmetric processing cores, according to one embodiment.

FIG. 8 illustrates a technique for managing power in a multi-asymmetric core architecture, according to one embodiment. In particular, FIG. 8 illustrates some example conditions that could cause a main processing core to transition from an operating state (e.g., C0) down to a lower power state (i.e., C6). For example, in one embodiment, the main core may transition to a low power state in response to an interrupt occurring targeted at the ULPC (ultra-low power core). Likewise, the main core may transition to an operating state (e.g., C1, C0, etc.) in response to an interrupt targeted at the main core or in response to the ULPC being utilized above a maximum threshold (e.g., 90% utilization). In other embodiments, another maximum utilization threshold could cause a transition of operation or control from the ULPC to the main core. In one embodiment, one of the cores (e.g., a lower-power, lower-performance core) may transition directly to low-power state (e.g., C0 state) without first transitioning to other interim power states.

Many different types of processing devices could benefit from the use of such process re-allocation techniques. For example, the processing units 600-1 through 600-N may be general purpose processors (e.g., microprocessors) or may be microprocessor cores for a multiple core (on a single die) microprocessor. Alternatively, digital signal processors, graphics processors, network processors, or any type of special purpose processor that may be used in a system with multiple parallel units or cores may benefit from thermally (or power) motivated process shifting between processing units. The processing units or processors may be identical or have at least partial functional overlap. That is, each processing unit has some common set of instructions or commands such that there are at least some (if not all) processes that can be executed on more than one processing unit or processor. In other embodiments, the processing units may be asymmetrical, in as much as they have any or a combination of different performance capabilities, number of transistors, power consumption or thermal characteristics, clock frequencies, or ISA.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine readable medium ("tape") and supplied to various customers or manufacturing facilities to load into the fabrication machines that actually make the logic or processor.

Thus, a method and apparatus for directing micro-architectural memory region accesses has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A multi-core processor comprising:
a first processing core having a first pipeline depth, and
second processing core to be used concurrently with the first processing core, the second processing core having a second pipeline depth that is smaller than the first pipeline depth and having lower performances compared to the first processing core,
wherein a first thread is to be scheduled to run on the first processing core and a second thread is to be scheduled to run on the second processing core, wherein the first thread is a software binary translation of a third thread compatible with the second processing core,
wherein the first thread is to be migrated to the second processing core based on a determination that the first thread may be run on the second processing core while maintaining an acceptable performance level, and
wherein when the first processing core is placed in a lower power or performance state, the first thread is migrated back to the first processing core.

2. A method comprising:
scheduling a first task to run on a first processing core of a multi-core processor,
the first processing core having a first pipeline depth;
scheduling a second task to run on a second processing core of the multi-core processor, the second processing core having a second pipeline depth that is smaller than the first pipeline depth and having lower performance compared to the first processing core, the second task to run concurrently with the first task;
monitoring an activity level of the first task running on the first processing core to determine whether the activity level falls below a threshold, wherein the first task is a software binary translation of a third task compatible with the second processing core;
migrating the first task to the second processing core when the activity level falls below the threshold and execution on the second processing core will maintain an acceptable performance level and the first task can tolerate latency associated with the migration;
migrating the first task from the second processing core to the first processing core when the activity level rises above the threshold.

3. A system comprising:
a graphics processor;
a memory controller;
peripheral control circuitry; and
a multi-core processor coupled to the graphics processor, the memory controller, and the peripheral control circuitry, the multi-core processor including
a first processing core having a first pipeline depth, and
a second processing core to be used concurrently with the first processing core, the second processing core having a second pipeline depth that is smaller than the first pipeline depth and having lower performance compared to the first processing core,
wherein a first thread is to be scheduled to run on the first processing core and a second thread is to be scheduled to run on the second processing core,
wherein the first thread is a software binary translation of a third thread compatible with the second processing core,
wherein the first thread is to be migrated to the second processing core based on a determination that the first thread may be run on the second processing core while maintaining an acceptable performance level, and
wherein when the first processing core is placed in a lower power or performance state, the first thread is migrated back to the first processing core.

4. A system comprising:
a graphics processor;
a memory controller;
peripheral control circuitry;
a multi-core processor coupled to the graphics processor, the memory controller, and the peripheral control circuitry, the multi-core processor including
a first processing core having a first pipeline depth and
a second processing core to be used concurrently with the first processing core, the second processing core having a second pipeline depth that is smaller than the first pipeline depth and having lower performance compared to the first processing core; and
a scheduler to
schedule a thread to run on the first processing core, wherein the thread is a software binary translation of a thread compatible with the second processing core,
migrate the thread to the second processing core when an activity level of the thread falls below the threshold and execution on the second processing core will maintain an acceptable performance level and the thread can tolerate latency associated with the migration;
migrate the thread from the second processing core to the first processing core when the activity level rises above the threshold.

* * * * *